United States Patent [19]

Theis

[11] 4,338,494
[45] Jul. 6, 1982

[54] TELEPHONE CALL INVENTORYING AND SEQUENCING SYSTEM AND METHOD

[76] Inventor: Peter F. Theis, 3203 Bay View La., McHenry, Ill. 60050

[21] Appl. No.: 167,798

[22] Filed: Jul. 11, 1980

[51] Int. Cl.³ .................. H04M 1/64; H04M 11/10
[52] U.S. Cl. ............................... 179/6.09; 179/6.17; 369/29
[58] Field of Search ............ 360/72.2, 15; 179/6.17, 179/6.09, 6.11; 369/29, 47, 27, 28; 364/200, 900

[56] References Cited

U.S. PATENT DOCUMENTS

| | | | |
|---|---|---|---|
| 3,141,931 | 7/1964 | Zarouni | 179/6.17 |
| 3,372,240 | 3/1968 | Boyers | 360/12 |
| 3,527,312 | 9/1970 | Dooley | 179/6.11 |
| 3,648,249 | 3/1972 | Goldsberry | 364/900 |
| 3,728,486 | 4/1973 | Kraus | 179/2 R |
| 3,914,551 | 10/1975 | Hunt | 179/6.01 |
| 4,150,255 | 4/1979 | Theis | 179/6.17 |
| 4,221,938 | 9/1980 | Mohammadioun | 179/6.09 |

*Primary Examiner*—Bernard Konick
*Assistant Examiner*—Alan Faber
*Attorney, Agent, or Firm*—Hume, Clement, Brinks, Willian & Olds, Ltd.

[57] ABSTRACT

An improved telephone call inventorying and sequencing system includes a plurality of automatic telephone answering machines and associated message memory units; a plurality of transcribing stations; and a matrix interconnecting the transcribing stations and the message memory units. A computer controls the matrix to connect each requesting transcribing station with a selected one of the message memory units. In each case, the computer selects the available message memory unit having the oldest untranscribed recorded message. In this way, recorded messages are transcribed in substantially the order in which they are recorded, and callback delays are therefore kept more nearly constant.

24 Claims, 6 Drawing Figures

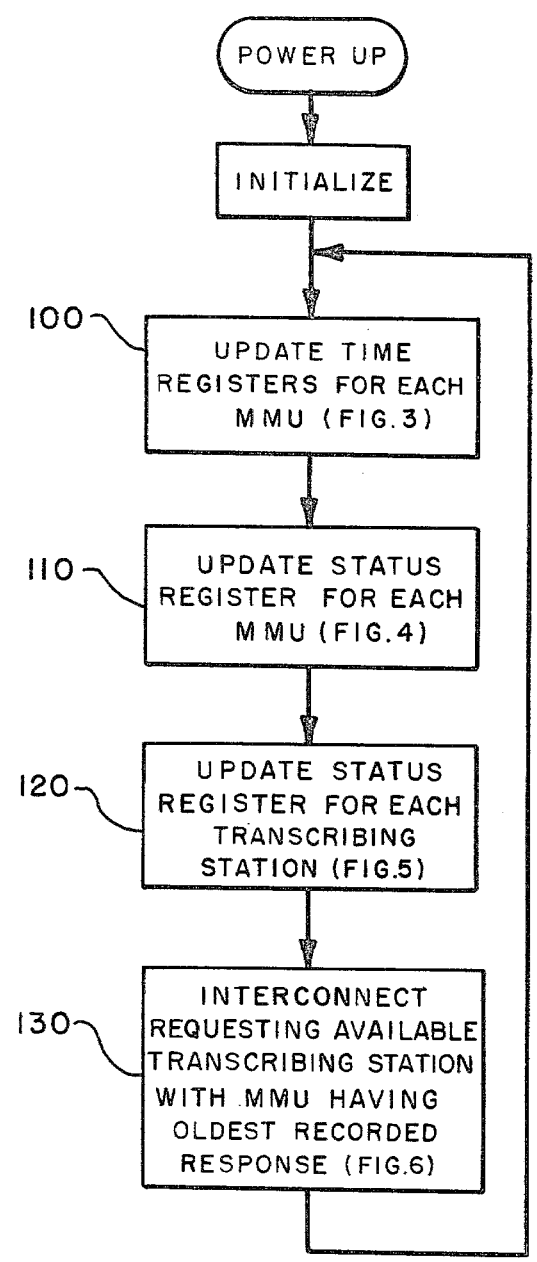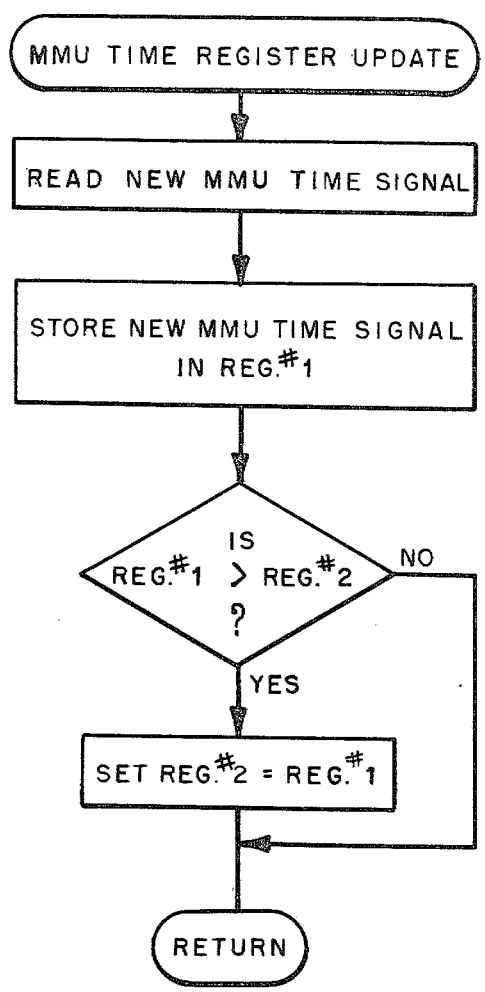

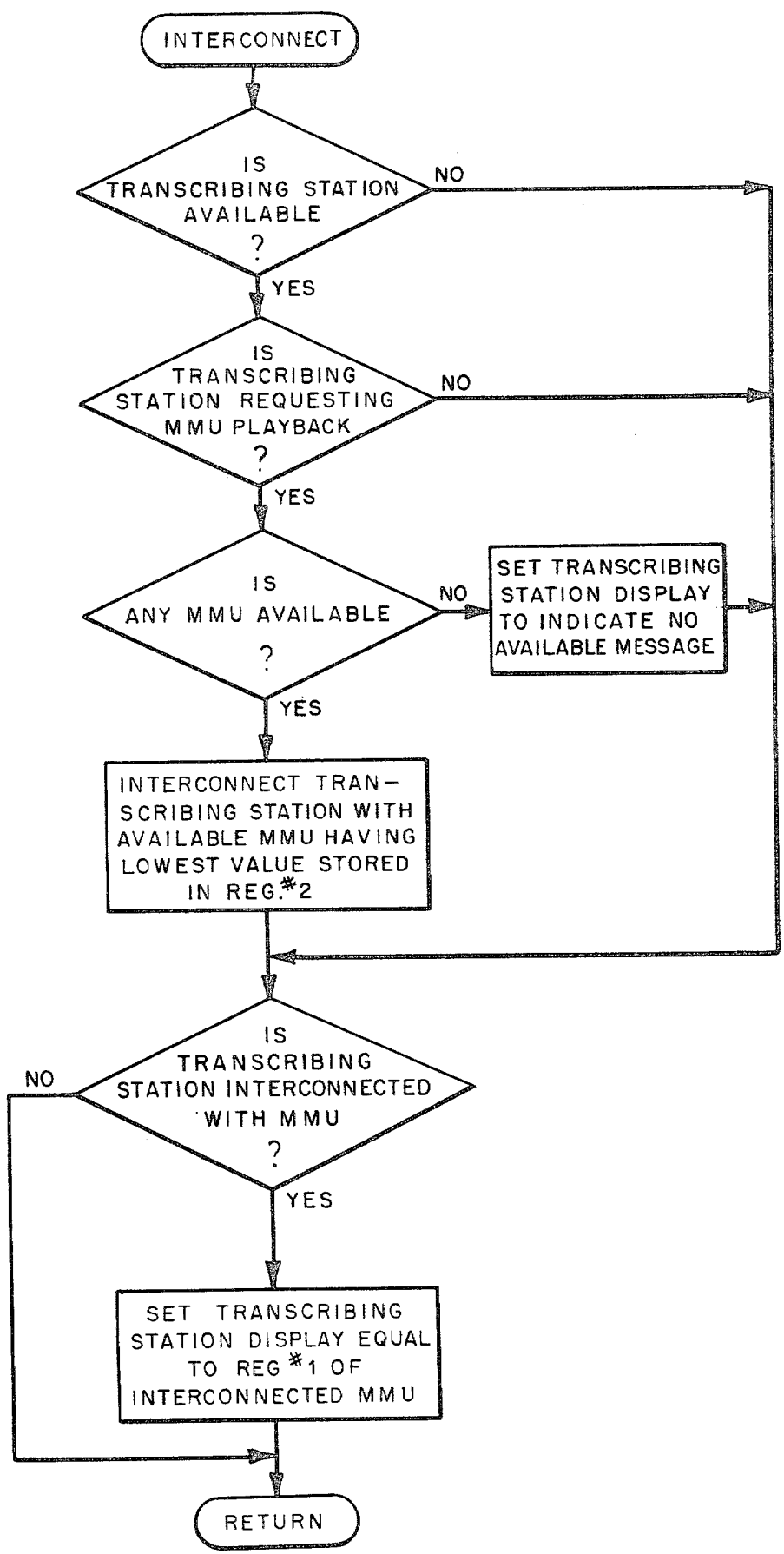

TELEPHONE CALL INVENTORYING AND SEQUENCING SYSTEM AND METHOD

BACKGROUND OF THE INVENTION

This invention relates to an improved apparatus and method for inventorying and sequencing telephone messages.

Modern telephone answering systems utilize a number of approaches to service peak traffic loads. For example, one approach is to answer ringing calls automatically, to record caller messages, and then to place each call on hold until an operator is available to service the call. Such a system is disclosed in my U.S. Pat. No. 4,150,255.

One practical limitation of such systems is that, when placed on hold by an automatic answering machine, callers will remain on hold for only a limited time period. After that period, more and more callers will hang up and terminate the connection. Long holding times can be a major source of caller frustration and dissatisfaction.

A further disadvantage of such systems is that callers are kept on hold while waiting for an available operator. This ties up telephone lines and severely limits the peak traffic that can be handled by the system. For example, if a system has twenty telephone lines, no more than twenty callers can be kept on hold at any one time. Additional callers only receive a busy signal, which can be an additional source of caller frustration.

A second type of answering system records caller messages and then terminates the telephone connection. Recorded messages are then transcribed at a later time and callbacks are made by an operator.

When multiple recording units are used to record caller messages in this second type of system, there is generally no assurance that recorded messages will be transcribed for callback in substantially the same order as that in which they were recorded. For example, an operator may transcribe a large number of messages from one recording unit and then switch to another recording unit. When this is done, the delay between the call and the callback can vary greatly and can become excessively long. Excessive callback delays represent a disadvantage, because an excessive delay can inconvenience callers and can increase the number of callbacks required to reach a caller. If a callback is delayed for an hour, for example, there is often an increased chance that a caller will have left the location from which he originally called.

SUMMARY OF THE INVENTION

The present invention is directed to an improved telephone call answering system and method which are less subject to the aforementioned disadvantages.

According to this invention, telephone calls are automatically answered and each caller message is automatically recorded in one of a plurality of recording units. When an operator requests transcription at a transcribing station, that station is automatically connected with a selected one of the recording units, which selected unit contains a recorded message which has not yet been transcribed and which was recorded at a time substantially no later than the earliest recorded, untranscribed message in a second one of said plurality of recording units.

In this way, messages are transcribed in much the same order as that in which they were recorded. This feature of the invention provides a more nearly constant callback delay time. Because calls are handled in substantially the same order as that in which they were received, there is a better chance at the time of the callback that callers will still be at the location from which they originally called.

With this invention calls can be inventoried and effectively queued for ten, twenty, thirty, or more minutes, without tying up telephone lines, thereby increasing the maximum traffic that can be handled by the system during peak periods.

The invention, together with further features and attendant advantages, will be best understood by reference to the following detailed description taken in conjunction with the accompanying drawings.

BRIEF DESCRIPTION OF THE DRAWINGS

FIG. 2 is a general flowchart of the program executed by the microprocessor of FIG. 1.

FIGS. 3-6 are detailed flowcharts of separate routines included in the general flowchart of FIG. 2.

DETAILED DESCRIPTION OF A PREFERRED EMBODIMENT

Figure 1:
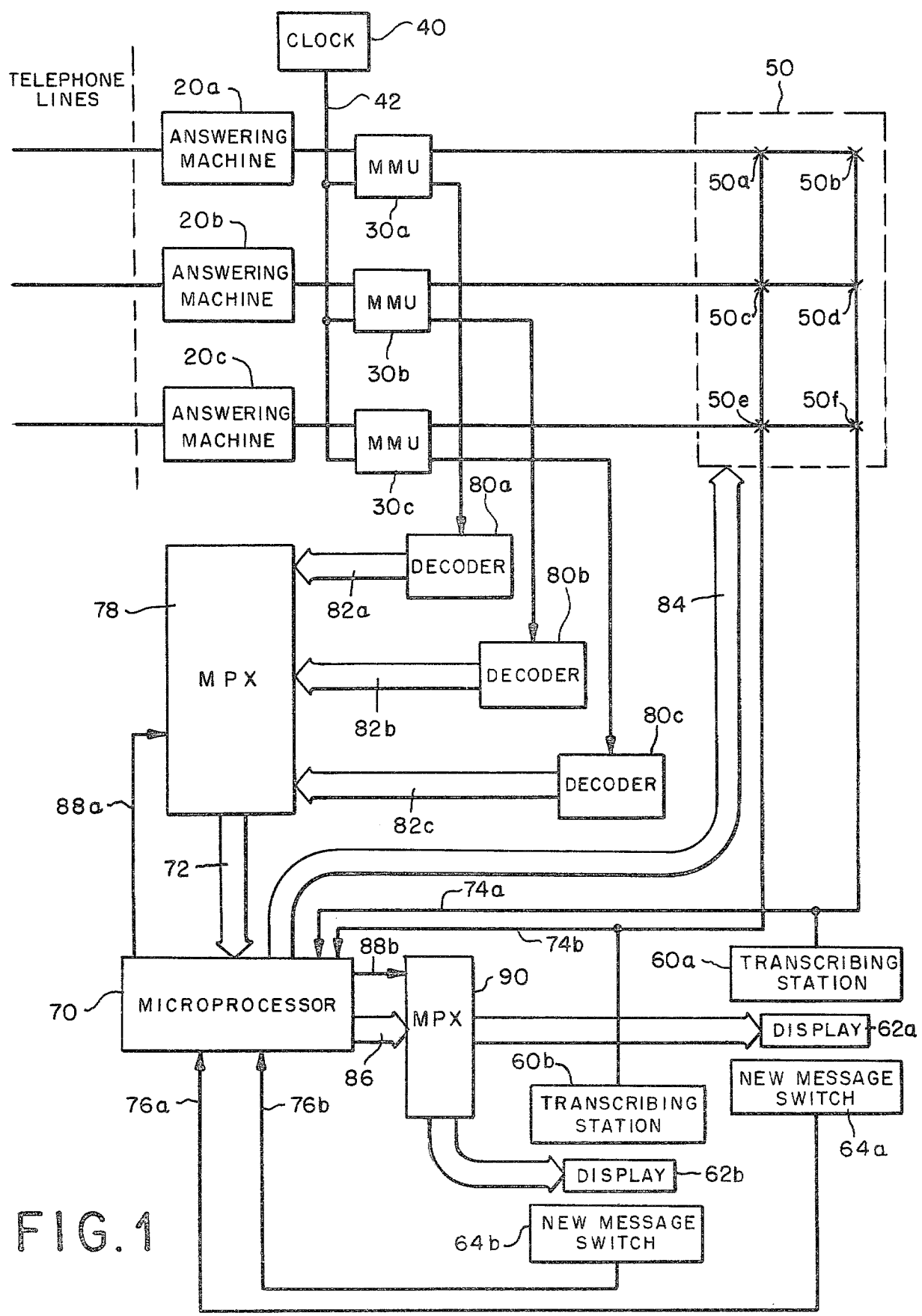
FIG. 1 is a schematic drawing of a preferred embodiment of the present invention.

Referring now to the drawings, FIG. 1 is a block diagram of a preferred embodiment of the present invention. This embodiment includes three answering machines $20a, b, c$, each of which is connected to a recording or message memory unit (MMU) $30a, b, c$, respectively. These components are known to those skilled in the art. For example, a Dictaphone Model 1650 can be used for each of the answering machines $20a, b, c$, while a Dictaphone Thought Tank or a Lanier Nyematic can be used for each of the MMU's $30a, b, c$.

Each of the MMU's is preferably a dual channel recording device having first and second recording channels. Each first recording channel is coupled to the corresponding answering machine $20a, b, c$ to record caller messages made in response to prerecorded requests replayed by the answering machine. Each second recording channel is coupled to a clock 40 which produces a priority signal such as an audio encoded digital time signal on line 42 on a regular basis. This time signal is recorded on the second recording channel of each MMU $30a, b, c$ whenever the MMU is recording caller messages from the corresponding answering machine $20a, b, c$. Also, each MMU has been modified to record a distinctive beginning of message signal on the second recording channel at the start of each caller message.

The three MMU's $30a, b, c$ are coupled to a matrix 50 which is in turn coupled to two transcribing stations $60a, b$. In this embodiment, each transcribing station $60a, b$ is a conventional operator station having means, such as a foot pedal, for generating MMU control signals through which the operator controls the replay of recorded responses by the associated MMU. The matrix 50 serves to interconnect the transcribing stations $60a, b$ with selected MMU's $30a, b, c$. The matrix 50 includes switches $50a-f$ which pass audio signals from the MMU to the transcribing station as well as control signals from the transcribing station to the MMU. These control signals allow the operator to start, stop, and rewind the MMU and thereby to control the replay of recorded caller messages. In addition, at each transcribing station $60a, b$ is a time display $62a, b$ and a switch $64a, b$.

The switches 50a-f of the matrix 50 are controlled by a microprocessor 70. This microprocessor 70 is programmed to repetitively execute the program flowcharted in FIGS. 2-6 and described below. Before discussing the operation of this program, the interconnections between the microprocessor 70 and the rest of the system will first be described.

The microprocessor 70 is provided with three sets of digital inputs ports 72, 74a, b and 76a, b. Input port 72 includes a plurality of separate digital data input ports, each of which is connected to a multiplexer 78. The multiplexer 78 in turn receives digital signals from three decoders 80a, b, c.

Each of these decoders 80a, b, c is connected to one of the three MMU's 30a, b, c such that the decoder 80a, b, c receives both the message waiting signal and the time signal from the second recording channel from the respective MMU. The message waiting signal is a standard output signal of conventional MMU's which is on when the MMU contains a recorded message to be transcribed, and which is off when the MMU contains no messages which have not been transcribed. Thus, when the message waiting signal is on, the MMU is, in effect, requesting transcription.

Each decoder 80a, b, c operates to transmit the message waiting signal from the respective MMU to the multiplexer 30a. In addition, each decoder 80a, b, c monitors the second recording channel of the respective MMU for beginning of message signals and time signals. Once a beginning of message signal is detected, the decoder 80a, b, c decodes the recorded time signal immediately following the beginning of message signal from audio format into a binary number which is supplied, along with the message waiting signal, to the multiplexer 78 via conductors 82a, b, c, respectively. The multiplexer 78 is under control of the microprocessor 70 such that the microprocessor can read the signals on any one of conductors 82a, b, c, via input port 72 under program control. Standard hardware components such as the KIM-1 marketed by Commodore or the AIM-65 marketed by Rockwell International can be used to implement the decoders 80a, b, c.

The second set of computer input ports 74a, b is coupled to the means for generating MMU control signals in the two transcribing stations 60a, b. The microprocessor 70 receives a signal via the ports 74a, b when an operator in a respective transcribing station 60a, b commands an MMU to start to replay a recorded message. As will be explained below, the signals on ports 74a, b are used to determine when either of the transcribing stations is requesting that a new recorded message be played.

The third set of input ports 76a, b is coupled to the switches 64a, b, respectively. These switches 64a, b are under operator control and provide the operator with some degree of manual control over the microprocessor 70, as explained below.

In addition to the input ports discussed above, the microprocessor 70 is also provided with three sets of digital output ports 84, 86, and 88a, b. Output port 84 includes a plurality of digital lines interconnecting the switches 50a-f and the microprocessor 70. By means of the port 84, the microprocessor 70 can individually set or reset any of the switches 50a-f to interconnect either of the transcribing stations 60a, b to any one of the MMU's 30a, b, c.

Output port 86 is also a multiple line bus. Port 86 connects the microprocessor 70 to the two displays 62a, b via the multiplexer 90 such that these displays 62a, b are both under the control of the microprocessor.

Output ports 88a, b includes digital lines which extend between the microprocessor 70 and the multiplexers 78, 90, respectively. These ports 88a, b provide the microprocessor 70 with control over the multiplexers 78, 90 such that the microprocessor 70 can select which of the decoders 80a, b, c and which of the displays 62a, b are connected to the microprocessor 70.

Turning now to FIGS. 2 through 6, the program of the microprocessor 70 is flowcharted in broad terms in FIG. 2. FIGS. 3 through 6 each present a more detailed flowchart of a portion of the program of FIG. 2. This program maintains a status register and two time registers (Reg #1 and Reg. #2) for each MMU as well as a status register for each transcribing station.

As shown in FIG. 2, an initialization routine is executed whenever the microprocessor is powered up. This routine sets both time registers for each MMU to zero, sets the status register for each MMU to unavailable, sets the status register for each transcribing station to available, and resets each of the switches 50a-f of the matrix 50. Following initialization, the microprocessor repeatedly executes four separate routines. The first three of these routines (MMU Time Register Update, MMU Status Register Update, and Transcribing Station Status Register Update) are housekeeping routines flowcharted in FIGS. 3-5 respectively. The fourth routine, (Interconnect) actually controls the matrix 50 to interconnect appropriate transcribing stations and MMU's, and is flowcharted in FIG. 6.

The MMU Time Register Update routine, which corresponds to block 100 of FIG. 2 and is flowcharted in FIG. 3, performs the following functions for each MMU. First an MMU time signal is read via input port 72 from the respective decoder 80a, b, c. This time signal is then stored in Reg. #1 for the appropriate MMU, and then compared with the value stored in Reg. #2 for that MMU. If Reg. #2 is less than Reg. #1, Reg. #2 is set equal to Reg. #1. Otherwise Reg. #2 is left unchanged. Thus, Reg. #1 is always equal to the time signal which has been decoded most recently by the associated decoder, while Reg. #2 indicates the time of the largest time signal which has been decoded by the associated decoder. As will be explained below, Reg. #2 is used to maintain proper control over an MMU after an operator has backspaced that MMU. In that the decoders 80a, b, c only decode the recorded time signal immediately following each beginning of message signal, Reg. #1 and Reg. #2 are not modified except at the beginning of messages.

Figure 4:
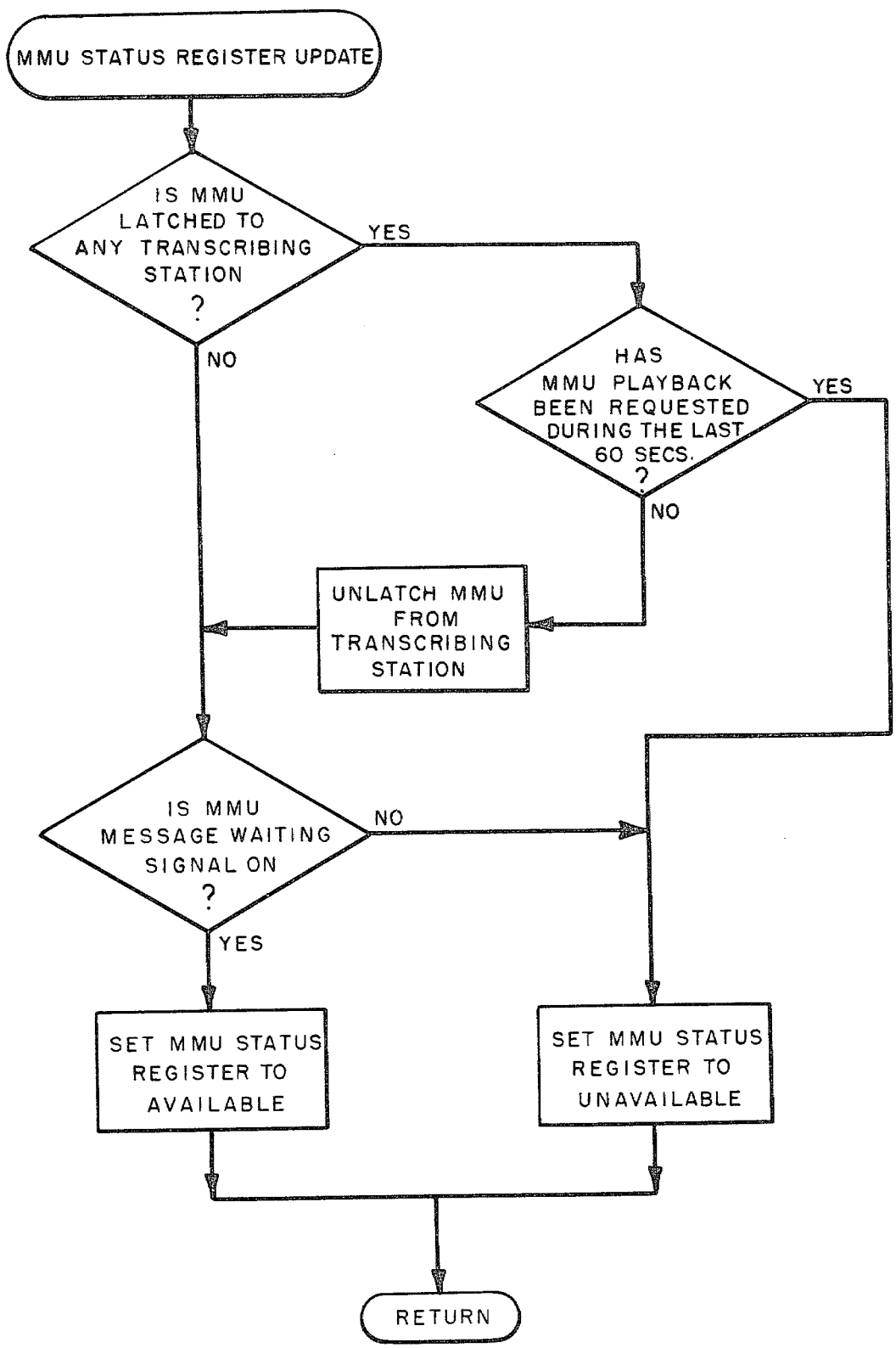

The next routine, corresponding to block 110 in FIG. 2 and flowcharted in FIG. 4, is MMU Status Register Update. An MMU status register is maintained for each MMU. Each register indicates whether the respective MMU is available for interconnection to a transcribing station. As shown in FIG. 4, the MMU Status Register is set to unavailable if an MMU is currently connected to a transcribing station and the MMU has been transcribed within the last minute, or if the message waiting signal for that MMU is off. Otherwise, the MMU Status Register is set to available. Thus, whenever an MMU does not have a message waiting, that MMU is unavailable. Similarly, whenever an MMU is interconnected with a transcribing station, that MMU is unavailable unless the MMU has not been transcribed from in the last 60 seconds. This last feature is implemented by programming the microprocessor 70 to monitor the input ports 74a, b on a regular basis for MMU forward control signals. This feature ensures that a transcribing station which becomes inactive while interconnected with an MMU does not monopolize that MMU. The microprocessor is programmed to recognize this condition and, when detected, to unlatch the MMU from the inactive transcribing station and then to restore that MMU to available status.

Figure 5:
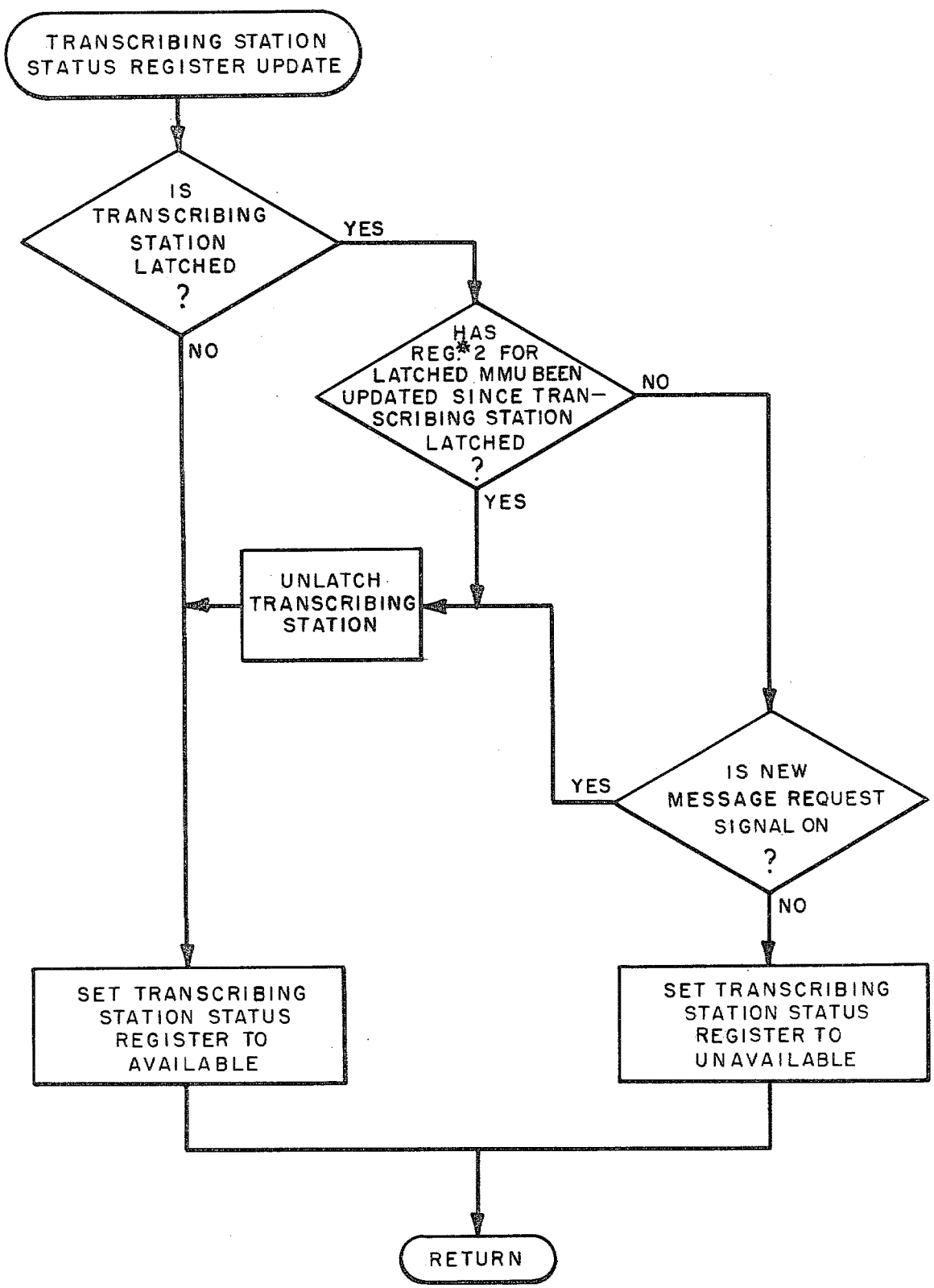

The next routine corresponds to block 120 in FIG. 2 and is flowcharted in FIG. 5. This routine updates the status of the transcribing station status register for each transcribing station in accordance with several variables. If the transcribing station is not latched to one of the MMU's at the time this routine is executed, the appropriate status register is set to available. Furthermore, if the transcribing station is latched to an MMU but Reg. #2 for that MMU has been updated since the two were latched together, then the transcribing station is unlatched from the MMU and the appropriate status register is set to available. Finally, if the transcribing station is latched to an MMU and the new message switch signal at data input port 76a, b is on, then the transcribing station is unlatched from the MMU and the appropriate status register is set to available. In all other conditions, the status register for the transcribing station is set to unavailable.

The last routine 130 in the program of FIG. 2 is flowcharted in FIG. 6. This routine controls the matrix 50 to interconnect available transcribing stations requesting MMU playback with the available MMU having the oldest untranscribed recorded caller message. This is accomplished by executing the program of FIG. 6 for each transcribing station. This program first checks the status register of the transcribing station to determine if it is available. Only if the transcribing station is available and is currently requesting MMU playback does the program attempt to find an available MMU. If there is no available MMU, as indicated by the MMU status registers, then the display 62a, b of the appropriate transcribing station is set to indicate that no MMU is presently available. If, however, one or more MMU's are available, the program then seeks the available MMU having the lowest value stored in its Reg. #2 and interconnects this MMU with the appropriate transcribing station.

Whether or not an interconnection has been made, the microprocessor then checks to determine whether the transcribing station is presently connected to an MMU. If so, respective display 62a, b is set equal to Reg. #1 of the interconnected MMU. In this way the operator in each transcribing station is able to read the time at which the response being replayed was recorded by the MMU.

Having described the structure and the computer program of this preferred embodiment, the operation of this embodiment can now be explained. In this embodiment, caller messages are recorded in the three MMU's 30a, b, c. These messages are transcribed by operators at two transcribing stations 60a, b. When an operator at a transcribing station requests that a recorded message be replayed, the microprocessor 70 interconnects the requesting transcribing station with the available MMU having the oldest untranscribed recorded message. Time signals generated by the clock 40 are physically associated with each recorded message, and these time signals are used by the microprocessor 70 to determine which MMU contains the oldest recorded message.

As explained above, an MMU is considered available if it contains an untranscribed recorded message and it is either not currently connected to a transcribing station or is connected but has not been transcribed during the preceeding 60 seconds. Once a transcribing station is latched to a particular MMU, the microprocessor 70 maintains the interconnection until the end of that recorded message or until the beginning of the next message. Then, if the transcribing station continues to request transcription, the microprocessor will again automatically seek the MMU having the oldest recorded message. If an MMU is backspaced, the interconnection between that MMU and the transcribing station is maintained until the MMU is returned to the recorded message following the original message at the time the first backspace was made. This feature allows the operator to retain control of an MMU for a period of time following a backspace. If, while latched to an MMU, a transcribing station fails to request playback for a preset period, the microprocessor unlatches the transcribing station from the MMU. In this way an inactive transcribing station will not monopolize an MMU.

The preferred embodiment described above provides a number of significant advantages over answering systems which simply place callers in a queue on hold. First, telephone lines are freed for additional calls, because calls are not being kept on extended hold. For this reason, unusually high levels of peak activity can be accommodated, and significantly fewer callers receive busy signals. The system described above permits calls to be inventoried for a longer time than when they are simply placed on hold. As a practical matter, calls can be kept on hold for only a few minutes in response to a recorded message. In contrast, the present invention allows calls to be effectively held for ten, twenty, thirty minutes, or more.

Additionally, the system described above allows callers to be automatically called back in substantially the same order as that in which they called. This feature assures a more nearly constant delay between the call and the callback than would be possible if a transcribing station simply transcribed a MMU until it was empty and then changed to another MMU. Because a time signal is recorded with the caller response, supervisors can determine how long the delay is between calls and callbacks, and can call in additional operators if necessary to prevent callback delays from becoming excessive. The present invention can be used in conjunction with other operators who handle calls live. In this case the overflow can be automatically handled by the answering machines of this embodiment for later callback. Of course, the transcribing stations of the system described above need not be located where the calls are being handled live.

Another advantage is that the MMU's can be used to record additional caller information basic to most callers, such as account numbers, order information, or the nature of a problem, for example. In some cases, this information may be sufficient to service the call, in which case unnecessary callbacks can be eliminated and efficiency of the overall system can be improved. In other cases, the operator can use the recorded information to prepare for the callback, for example by obtaining the answer to a caller's question. Furthermore, the callback may actually be faster than handling the call live because the operator is more in control of the conversation.

The present invention is not limited to systems which order recorded messages in strict chronological order for transcription. To the contrary, the present invention can be used with a wide range of methods for establishing the priority in which messages are transcribed. For example, a time based priority system of the type described above can be used in conjunction with a telephone line priority system. Such an alternate embodiment could cause messages to be automatically transcribed in chronological order, except that all messages recorded from a preferred telephone line would be transcribed before messages recorded from other lines. Other embodiments of the invention may utilize other types of priority systems, such as systems based on priority information provided by the caller by means of a touch tone code, to establish automatically the relative order in which recorded messages are transcribed. Such preferred telephone line and caller supplied code priority systems allow preferred callers to receive preferred service.

Of course, it should be understood that various changes and modifications to the preferred embodiment described above will be apparent to those skilled in the art. For example, a greater or lesser number of MMU's and transcribing stations can be used. In addition, the time signal can be recorded on the same recording channel as the recorded message, and the time signal can be merely a sequence number indicative of relative order rather than actual time. If a twelve or twenty four hour clock is used to provide the time signal, the microprocessor can be programmed to recognize the clock reset at the end of the counting period and to properly order recorded responses. These and other changes and modifications can be made without departing from the spirit and scope of the present invention, and without diminishing its attendant advantages. It is, therefore, intended that all such changes and modifications be covered by the following claims.

I claim:

1. A telephone call inventorying apparatus comprising:
    means for automatically recording a plurality of telephone messages transmitted over a plurality of telephone lines, said recording means including a plurality of recording units, each recording unit comprising a respective recording medium and adapted to be coupled to one of the telephone lines during the period of a call to record on the respective recording medium messages transmitted over the coupled telephone line;
    means for recording a respective sequence signal for each of the messages, each sequence signal being recorded on the respective recording medium in physical association with the respective message, said sequence signals indicative of the sequence in which the plurality of messages were recorded by the plurality of recording units;
    means for transmitting messages recorded by said recording means, said transcribing means including manually controlled means for generating a control signal;
    means, responsive to the recorded sequence signals, for automatically determining a selected one of said plurality of recording units, which selected recording unit contains a recorded message which has not yet been transcribed and which is associated with a recorded sequence signal indicative of an earlier message than the untranscribed messages recorded in a second one of said plurality of recording units; and
    means, responsive to the control signal, for interconnecting said transcribing means with the selected one of said plurality of recording units to enable said transcribing means to transcribe from said selected recording unit.

2. The apparatus of claim 1 wherein the determining means comprises:
    means for reading recorded sequence signals associated with the messages recorded in each recording unit as the recorded messages are replayed; and
    means for comparing sequence signals generated by the reading means to determine the selected recording unit.

3. The apparatus of claim 2, wherein each recording unit comprises means for recording a beginning of message signal at the beginning of each recorded message on the respective recording medium, and wherein the reading means acts to read only those sequence signals recorded at substantially the same time as the respective beginning of message signals.

4. The apparatus of claim 1 wherein the recording means operates to record each of the sequence signals as a respective digitally encoded audio signal.

5. The apparatus of claim 1 wherein the recording means comprises a plurality of telephone answering machines and each of the recording units comprises a respective message memory unit, each message memory unit coupled to a respective one of the telephone answering machines during the period of a call.

6. A telephone call inventorying apparatus comprising:
    means for automatically recording a plurality of telephone messages transmitted over a plurality of telephone lines, said recording means including a plurality of recording units, each recording unit comprising a respective recording medium and adapted to be coupled to a selected one of the telephone lines during the period of a call to record messages transmitted over the respective telephone line on the respective recording medium;
    means for transcribing messages recorded by said recording means, said transcribing means including manually controlled means for generating a control signal;
    means for automatically determining a selected one of said plurality of recording units, which selected recording unit contains a recorded message positioned for transcription, which recorded message has not yet been transcribed and which was recorded at a time substantially no later than the untranscribed messages recorded in a second one of said plurality of recording units, said determining means comprising means for recording a respective sequence signal in association with each message, each sequence signal being recorded on the respective recording medium in physical association with the respective message, means for reading recorded sequence signals as the recorded messages are transcribed, and means for automatically comparing sequence signals generated by the reading means to determine the selected recording unit; and
    means, responsive to the control signal, for interconnecting said transcribing means with the selected one of said plurality of recording units to enable said transcribing means to control and to transcribe from said selected recording unit.

7. The apparatus of claim 6 wherein the recording means operates to record each of the sequence signals as a respective digitally encoded audio signal.

8. The apparatus of claim 6 wherein the recording means comprises a plurality of telephone answering machines and each of the recording units comprises a respective message memory unit, each message memory unit coupled to a respective one of the telephone answering machines during the period of a call.

9. A telephone call inventorying apparatus comprising:
- means for automatically recording a plurality of telephone messages transmitted over a plurality of telephone lines, said recording means including a plurality of recording units, each recording unit comprising a respective recording medium adapted to be coupled to a selected one of the telephone lines to record messages transmitted over the respective telephone line;
- means, coupled to each recording unit, for automatically recording a sequence signal in physical association with each recorded message, said sequence signal indicative of the sequence in which the recorded messages are recorded;
- means for transcribing messages recorded by said recording means, said transcribing means including manually controlled means for generating a control signal;
- switch means for selectively interconnecting the transcribing means with one of the recording units to enable the transcribing means to control the interconnected recording unit to transcribe therefrom;
- circuit means coupled to the sequence signal recording means, the control signal generating means, and the switch means;
- means, included in the circuit means, for reading the recorded sequence signals and generating a respective index signal for each recording unit, each index signal indicative of the sequence of the earliest untranscribed message recorded in the respective recording unit;
- means, included in the circuit means, for controlling the switch means in response to the control signal to automatically connect the transcribing means to the available recording unit having the index signal indicative of the earliest message.

10. The apparatus of claim 9 wherein the message recording means includes a plurality of telephone answering machines and each of the recording units comprises a respective message memory unit, each message memory unit coupled to a respective one of the telephone answering machines during the period of a call.

11. The apparatus of claim 9 wherein each of the sequence signals is recorded as a respective digital pattern of audio signals.

12. The apparatus of claim 9 or 11 wherein each of the sequence signals is indicative of the time at which the associated recorded message is recorded.

13. The apparatus of claim 12 further comprising means, included in the transcribing means and responsive to the circuit means, for displaying during transcription a display signal corresponding to the sequence signal associated with the recorded message being transcribed.

14. The apparatus of claim 9 further comprising means for automatically disconnecting the transcribing means from the previously connected one of the plurality of recording units after the transcribing means has been inactive for a period greater than a selected time period.

15. The apparatus of claim 9 further comprising means, included in the circuit means, for automatically disconnecting the transcribing means from the previously connected one of the plurality of recording units after a message recorded in said one recording unit has been transcribed.

16. The apparatus of claim 9 wherein each recording unit comprises means for recording a beginning of message signal at the beginning of each recorded message, and wherein the reading means acts to read only those sequence signals recorded immediately after the respective beginning of message signals.

17. The apparatus of claim 9 or 16 further comprising means, included in the circuit means, for automatically disconnecting the transcribing means from one of the plurality of recording units after the respective index signal for the one of the plurality of recording units is changed by the index signal generating means.

18. A telephone call inventorying apparatus comprising:
- means for automatically recording a plurality of telephone messages transmitted over a plurality of telephone lines, said recording means including a plurality of recording units, each recording unit comprising a respective recording medium and adapted to be coupled to a selected one of the telephone lines to record messages transmitted over the respective telephone line on the respective recording medium;
- means, coupled to each recording unit, for automatically recording a respective sequence signal in physical association with each recorded message on the respective recording medium, said sequence signals indicative of the sequence in which the recorded messages are recorded;
- means for transcribing messages recorded by said recording means, said transcribing means including a plurality of transcribing stations, each transcribing station including means for generating a respective control signal;
- switch means for selectively interconnecting each of the transcribing stations with a selected one of the recording units;
- decoder means, coupled to the sequence signal recording means, for reading the recorded sequence signals and generating an index signal for each recording unit, each index signal indicative of the sequence of the recorded message positioned for transcription on the respective recording unit;
- a computer coupled to the decoder means, the switch means, and the control signal generating means;
- first means, included in the computer, for maintaining a status register for each recording unit such that each recording unit status register is placed in a first state when the respective recording unit is available for transcription;
- second means, included in the computer, for maintaining a status register for each transcribing station such that each transcribing station status register is placed in a first state when the respective transcribing station is available for connection to a recording unit;
- means, included in the computer and responsive to the index signals, the recording unit status registers and the transcribing station status registers, for responding to a control signal associated with an available transcribing station by controlling the switch means to interconnect the respective transcribing station with the available recording unit having the earliest recorded message positioned for transcription to enable the respective transcribing station to control the interconnected recording unit to transcribe the recorded message positioned for transcription therein.

19. The apparatus of claim 18 wherein each of the sequence signals is recorded as a respective digital pattern of audio signals.

20. The apparatus of claim 18 or 19 wherein each of the sequence signals is indicative of the time at which the associated recorded message is recorded.

21. The apparatus of claim 20 further comprising means, included in the transcribing means and responsive to the computer means, for displaying during transcription the sequence signal associated with the recorded message being transcribed.

22. The apparatus of claim 18 further comprising means, included in the computer means, for automatically disconnecting one of the transcribing stations from a previously connected one of the recording units after said one transcribing station has been inactive for a period greater than a selected time period.

23. The apparatus of claim 18 further comprising means, included in the computer means, for automatically disconnecting one of the plurality of transcribing stations from a previously connected one of the plurality of recording units after an untranscribed message recorded in said one recording unit has been transcribed.

24. The apparatus of claim 1 or 6 or 9 or 18 wherein each of the recording media comprises a respective magnetic tape and the recorded messages in a selected recording unit and the associated sequence signals for the recorded messages in the selected recording unit are recorded on the same magnetic tape.

* * * * *

UNITED STATES PATENT AND TRADEMARK OFFICE
CERTIFICATE OF CORRECTION

PATENT NO. : 4,338,494
DATED : July 6, 1982
INVENTOR(S) : Peter F. Theis

It is certified that error appears in the above—identified patent and that said Letters Patent is hereby corrected as shown below:

At Column 7, line 58 (Claim 1) delete the word "transmitting" and substitute therefor --transcribing--.

Signed and Sealed this

Twenty-ninth Day of March 1983

[SEAL]

Attest:

GERALD J. MOSSINGHOFF

Attesting Officer

Commissioner of Patents and Trademarks